United States Patent Office 3,440,456
Patented Apr. 22, 1969

3,440,456
COMMUTATING ARRANGEMENT FOR ELECTRIC MACHINES WITH SUPERCONDUCTING ARMATURE COILS
Erich Grunwald, Erlangen, and Wilhelm Kafka, Tennenlohe, Germany, assignors to Siemens Aktiengesellschaft, a corporation of Germany
Filed Mar. 11, 1966, Ser. No. 533,474
Claims priority, application Germany, Apr. 15, 1965, S 96,551
Int. Cl. H02k 47/04
U.S. Cl. 310—10
3 Claims

ABSTRACT OF THE DISCLOSURE

Two electric machines are coupled to each other by a DC circuit common to both machines to provide a coupling converter unit for AC lines. Each machine comprises a superconducting armature winding which comprises a plurality of loops. Each of the loops includes a portion which operates as a switching path which is alternately switched between the normally conducting and superconducting states. A multi-phase rotating magnetic field is provided which has a superimposed DC field and which is movable relative to the switching paths for switching the paths between the states.

Our invention relates to superconducting devices. More particularly, it relates to commutating arrangements for DC machines which have superconducting armature coils.

At present there exists a need for generators having superconducting armature coils to supply utilization devices such as superconducting field coils or to energize transmission lines which comprise superconducting material. The use of such generators presents the advantage that pulse locations between the superconductors and the normal conductors are unnecessary. The use of these generators presents the added advantage that considerably higher energies may be converted therein on a smaller area as compared to machines which comprise armature coils having normal conductors.

Commutation in direct current machines with superconducting armature coils is achieved with great difficulty. In this connection, a large accumulation of heat occurs locally between a superconducting collector and a semiconducting brush because of transfer resistance, such heat being quite difficult to remove at the low superconducting temperatures. Furthermore, the amount of pressure may not be sufficiently increased for the transfer resistance to attain an acceptable value. The pressure of a high amount of friction limits this increase.

An effective arrangement for achieving proper commutation in direct current machines having superconducting armature coils has been to connect sections of the armature winding as switching paths (high current cryotrons) using an operating magnetic field, relative motion being provided between the paths and the magnetic field, the paths being alternately switched between the superconducting and normally conducting states. Thereby, the commutation is transferred to the coil winding of the armature.

No commutation is carried out in the latter arrangement in known magnetic flux pumps comprising a superconducting material whereby only one polarity current pulses may be produced from these machines and substantially no relatively unvarying unidirectional current. In addition, the field provided by the operating magnet has to be constantly varied in a chosen manner and accordingly high speed direct current machines cannot be provided and whose principle of operation is as detailed hereinabove.

In the operation of known flux pumps, a relatively inductance-free magnetic field is introduced into a tape-shaped armature winding turn on a high inductance coil by virtue of the fact that a surrounding conducting region of the tape is transferred to normal conductivity by the action of a pump magnet. The field of the pump magnet is subsequently changed in the armature turn. A voltage, or a current which builds up a magnetic field is induced in this pump phase. By means of several pump phases, a magnetic field is ultimately brought to a threshold value, circulating in the armature turn to an increasingly higher value. If, instead of the relatively wide tapes, it is preferred to employ wire-type superconductors, an additional current path has to be provided in order not to interrupt the coil current during the local transition of a conductor section. Another known flux pump operates in accordance with the latter principle.

Still another known current source is also operated without commutation. It essentially comprises a thin, round superconducting lead disc, a field coil being positioned between brackets attached to the center and to the edge. A magnetic pole is rotated below the lead disc, the latter pole having a field strength such that a plate dot, adjoined to the rotated magnetic pole, is brought to the transition state and rotates with the magnetic pole. The inductance of a current passing through the field coil should be effected by the intertwining of the flux through the normally conducting opening on the lead plate and the flux through the "hole" formed by the field coil, the connecting brackets and the connecting base line on the lead plate whereby each flux remains unvarying. With such arrangement, there should be induced a current which produces a correspondingly unvarying magnetic flux. Hence, this arrangement also effectively relates to a type of flux pump in which the number of rotations of which it is capable remains limited according to specifications.

In an alternative current source of the last mentioned type, a three-phase rotary field on which there is superimposed a direct current magnetic field is substituted for the rotating magnetic field. This current source operates without rotating parts but also exhibits the previously mentioned disadvantages.

Accordingly, it is an important object of this invention to provide an improved commutating arrangement for a direct current machine having a superconducting armature coil.

It is another object to provide a commutating arrangement in accordance with the preceding object which includes no rotating parts.

These objects are achieved by providing a commutating arrangement for a direct current machine with a superconducting armature coil of the type having switching paths as described hereinabove and which embodies no rotating parts. To this end, the operating magnetic field in the commutating arrangement is produced by a multi-phase rotary field with a superimposed direct current field.

Electric machines constructed according to the principles of the invention, i.e., without rotating parts, are suitably employed in another capacity, i.e., they can be utilized as direct current transformers, direct current generators, and alternating current generators for coupling three-phase alternating current lines. Individual three-phase compound current lines may thereby be coupled for direct current through superconducting cables which offers the great advantage of not requiring phase coordination. In all of these machines, pole changing fields may render the switching paths current-free prior to their entering the operating magnetic field, which yields a substantially loss-free commutation. Otherwise, the losses consist in the loss of the magnetic energy stored in the connected circuit. However, these losses may be readily evaluated by the mathematical calculation thereof.

Generally speaking and in accordance with the invention, there is provided in an electric machine which comprises a superconducting armature winding in which the winding comprises a plurality of loops, each of the loops respectively including a portion which operates as a switching path which is alternately switched between the normally conducting and superconducting states, means for providing a multi-phase rotating magnetic field having a superimposed direct current field and which is movable relative to the switching paths for switching the paths between the aforesaid states.

The foregoing and more specific objects and features of our invention will be apparent from and will be mentioned in the following description of a commutating arrangement for an electric machine having a superconducting armature winding shown by way of example in the accompanying drawing.

In the drawing, FIGS. 1a and 1b are schematic depictions of embodiments of electric machines having superconducting armature windings in which respective portions of the loops of the windings are operative as switching paths which are alternately switched between the superconducting and normally conducting states in response to the action of a magnetic field thereon which is movable relative thereto;

Figure 1A:
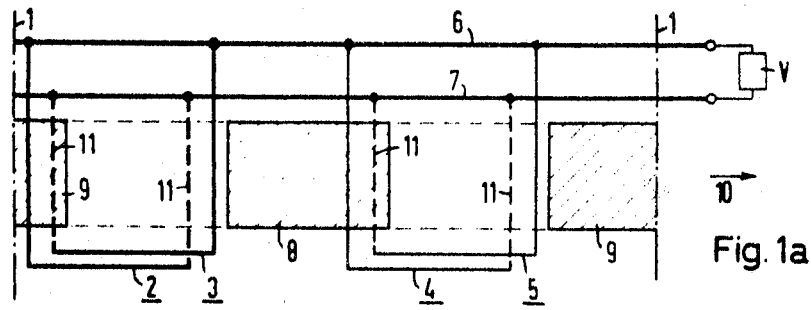

Referring now to FIG. 1, wherein there is schematically depicted the principle of operation of an electric machine having a superconducting armature coil in which portions of the turns of the armature winding operate as switching paths, it can be considered that the armature winding shown therein has been sectioned along the section line 1. The coils in the groups comprising coils 2 and 3, and 4 and 5 respectively should be considered as being disposed over each other and are shown adjacent to each other in the interests of clarity of illustration and description. With the arrangement shown in FIG. 1, there are provided readily accessible spaces free of armature winding ends which render the machine suitable for cooling. The coils in a group and the groups of coils are electrically connected in parallel with each other and in parallel with collector bus bars 6 and 7 for current removal. Structures 8 and 9 represent operating magnetic poles which are of like magnetic polarity.

The operating poles may be permanent magnets or electromagnets which may be provided by means of a winding in a cryostat for normal or superconductors. Normal conditions may also be employed in a cryostat to produce magnetic fields for operating poles. The excitation coil may be supplied with the produced current or independently by self or separate excitation. Poles 8 and 9 may be considered as being disposed below the armature winding and moving past the armature winding in the direction of the arrow 10.

The armature winding may be fixedly disposed within a crostat. This has the advantage in stationary operating poles, as compared to a movable armature winding, that no contact problems occur in the current utilization devices. Each turn of the armature winding has a switching path 11 shown in FIG. 1 in broken lines. These switching paths are chosen to comprise a superconducting material whose critical field strength is smaller than the magnetic field strength of the operating poles which are utilized. Such critical field strength should be so high that no transition may occur because of armature currents, even in situations of highest stress. During the movement of the operating poles past the sections of the armature coil which are designed as switching paths, the latter are alternately switched between the superconducting and normally conducting states.

Switching paths 11 may comprise such superconductors as, for example, lead or niobium, or alloys of the lead-bismuth, niobium-tantalum, or molybdenum - rhenium types. In the switching paths, the superconductors are preferably employed in thin layers not exceeding a thickness of $10^{-5}$ centimeter in order to enable the increasing of their ohmic resistance in the normally conducting state by means of the length of the path. The remainder of the coil sides of the armature winding are chosen to comprise such hard superconductors which remain in the superconducting state even when they are subjected to the influence of the operating pole field. These remaining sides may be wire or tape-shaped and may be comprised of alloys such as mobium-zirconium or titanium-niobium, or intermetallic compounds such as, for example, niobium-tin ($Nb_3Sn$) or vanadium-gallium ($V_3Ga$). Critical current densities of hard superconductors are, for example, approximately $10^5 A./cm.^2$ in niobium-tin at a field strength of 20 kilograms. The magnitude of the armature current density must be below this value.

In coil groups 2 and 3, and 4 and 5 respectively, switching paths 11 are provided at alternate coil sides and the coils are also connected to bus bars 6 and 7 in mutually alternating relationships. With such arrangement, there are produced two adjacently occurring voltage pulses. The coil side disposed parallel to the direction of the relative movement between the coils and the operating poles is chosen to have a length no longer than the width of pole surface (parallel to the direction of relative movement). The respective groups of coils are uniformly spaced from each other at a spacing of one coil width about the periphery of the armature and as many operating poles are provided such that a longitudinal side of the coils (transverse to the direction of the motion) always lies in the operating magnetic field. In the embodiment shown in FIG. 1, the armature coils extend over half a pole pitch. It is preferable that coil length be at least as large as the length of the operating poles (transverse to the direction of movement). If the coils are selected to be wider than the operating poles, then a short circuit would repeatedly occur in a connection with a load. On the other hand, if the coils are selected to be not as wide as the width of a pole, then the width of the operating pole is not fully utilized. The double pulses of voltage produced from the individual coil groups occur next to each other. Several coil groups may also be used which partially overlap each other.

A particular advantage of the described direct current machine resides in the fact that the commutation losses therein may be readily and precisely determined and can be eliminated or, at least, substantially minimized, such capability being of paramount importance in the design of large machines. The power loss may be determined from the induced voltage applied at the output terminals, from the resistance of the switching path in its normally conducting condition, from the circuit inductance, and from the coil current.

Figure 1B:
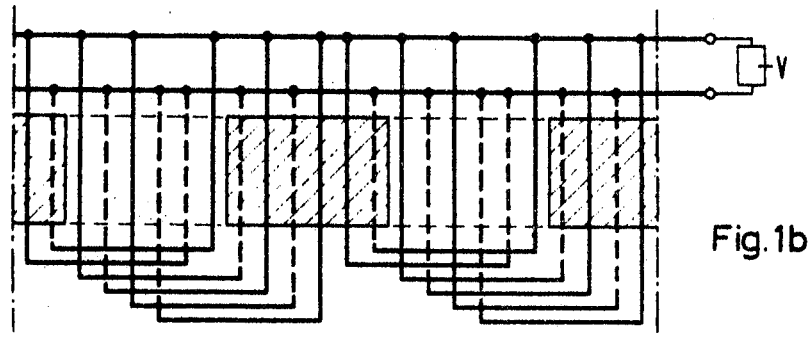

In the arrangement depicted in FIG. 1b, wherein structures corresponding to like structures in FIG. 1a are designated with the same numerals, the coils have the same widths as those shown in FIG. 1a and are connected to the bus bar in the same manner. However, instead of two double conductors as shown in FIG. 1a, six double conductors are provided for each pole. Thus, the operating voltage is induced in three coils per operating pole, such three coils being connected in parallel relationship.

Figure 2:
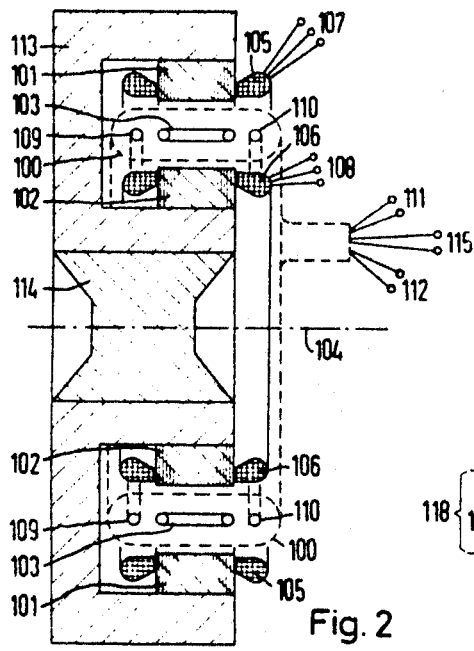
FIG. 2 is a depiction, partly in section, of an illustrative embodiment of a commutating arrangement for an electric machine having a superconductive armature winding constructed in accordance with the principles of the invention.

Referring now to FIG. 2 wherein there is shown a schematic depiction of an electric machine having a superconducting armature coil and a commutating arrangement therefor constructed in accordance with the principles of the invention, it is noted that such depiction is in the form of an axial section. In this figure, a superconducting armature winding 103 is disposed in a ring-shaped cryostat in the air gap between the ring-shaped poleshoes 101 and 102 which are comprised of stacks of sheet metal laminations and annular sheet metal yokes. This armature winding may be designed as described or it may also be designed in accordance with the arrangements shown in FIGS. 1a and 1b. Within the annular sheet metal yokes 101 and 102 which are coaxially disposed with respect to the axis of symmetry and whose annular discs lie perpendicular to the axis 104, there are provided excitation windings 105 and 106 for a three-phase rotary field. The latter windings may be wound in a known manner such as is employed in induction (asynchronous) machines or Scherbius machines. Instead of such double ring-shaped excitation winding whose loops may be radially connected and radially arranged above and below with respect to the armature coil, a single, annularly constructed excitation winding may also be employed. The latter winding is then disposed on a peripheral side of armature coil 103. The double ring-shaped excitation winding, however, provides a particularly advantageous interlinking between the rotary current and the direct current winding. The alternating current excitation windings 105 and 106 are connected through terminals 107 and 108 to a three-phase current line to produce a rotating magnetic field which rotates about axis 104 whereby the annular slot wherein cryostat 100 is disposed is perpendicularly threaded with the flux lines of the magnetic field. The rotating magnetic field has a return path in the annular sheet metal yokes 101 and 102.

The annular conductors or annular coils 109 and 110, which are concentrically arranged relative to axis 104, are preferably disposed in cryostats 100. With such arrangement, each annular conductor may be excited by a direct current, through a pair of connecting terminals such that the magnetic fields support each other in the air gap between the pole shoes. A direct current magnetic field is then superimposed over the direct current field. The direct current magnetic field has a return path in an annular yoke 113 which may suitably be of the cup magnet type. A centrally disposed structure 114 may be provided for mounting purposes. The connecting terminals for the armature coil are designated by the numeral 115.

In the electric machine constructed in accordance with the principles of the invention, the cmmutating operating poles of like polarity are provided in the annular air gap by the superimposing of the rotating field and the direct current field. It follows, of course, that the direct current field to be superimposed on the rotating field has to be of such field strength whereby, in the resulting field, only one polarity exceeds the respective critical field strengths of the switching paths.

Figure 3:
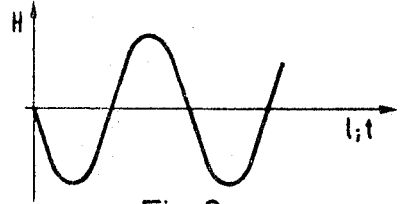
FIG. 3 is a graph which indicates field strength dependency upon the length of the periphery of the rotating magnetic field which is employed according to the invention.

The graph of FIG. 3 shows the length dependency of the field strength of the rotating magnetic field. In FIG. 3, the ordinate H, which represents the field strength, and the abscissa which represents the length 1 of the periphery of the excitation coil, are plotted at a given moment, $t$, for a chosen location. Thereby, the sign of the inductance is changed.

Figure 4:
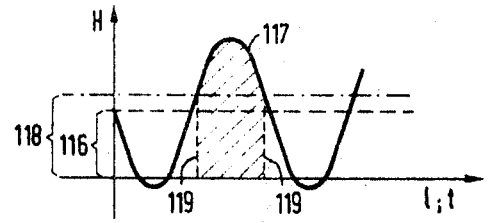
FIG. 4 is a graph similar to that shown in FIG. 3 and indicates the effect of superimposing a direct current magnetic field on the rotating magnetic field in accordance with the principles of the invention.

The graph depicted in FIG. 4, which is essentially similar to the one shown in FIG. 3, shows the resulting field 117 which is produced by superimposing a rotating field according to FIG. 3 and a direct current magnetic field 116. The field portion which functions as an operating pole lies between lines 119, such portions being crosshatched in FIG. 4 for purposes of clarity of exposition. The active field portion is obtained by projecting the magnitude of the critical field strength 118 of the switching path 117 of the resulting field. The vertical lines between the intersection at curve 117 and abscissa then limits the range of the field which is active as an operating pole.

If the machine, constructed in accordance with the principles of the invention, is employed for coupling alternating current lines, then one machine operates as a DC–AC converter at one line and another machine performs the same action at another line. The method of operation of the machine thereby depends upon the flow of power which may be determined by the magnitude of the direct current excitation in one or both machines. The dimensioning of the alternating current coils can be chosen in accordance with the respective line which is to be connected. Advantageously, both machines are connected by a superconducting direct current cable.

Figure 5:
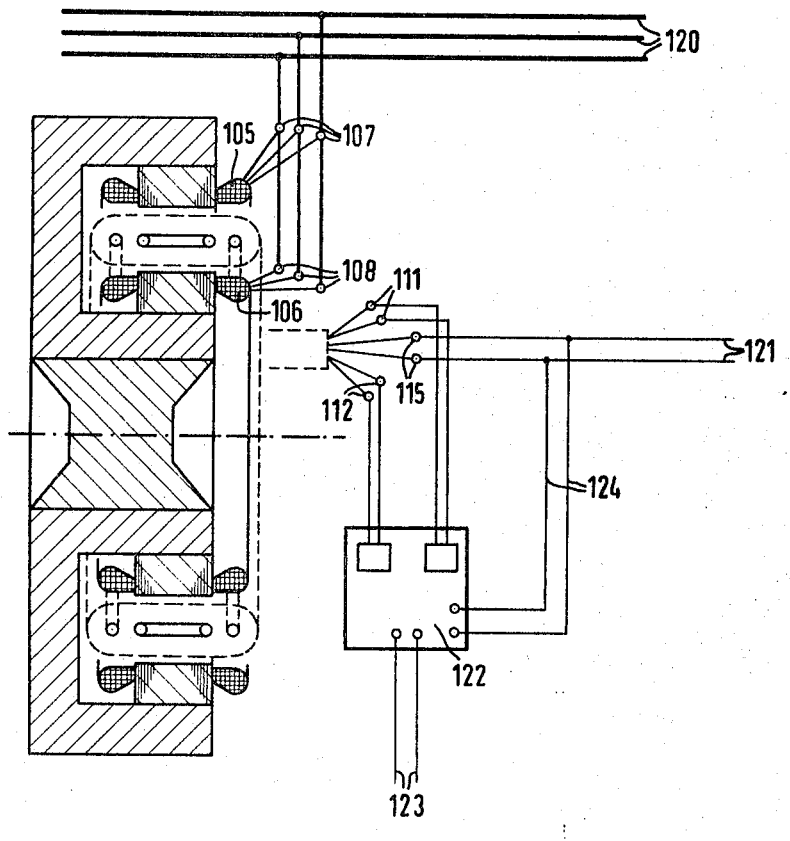
FIG. 5 is a depiction similar to that of FIG. 2 of another embodiment according to the invention.

FIG. 5 is an illustration of the machine of the present invention utilized as an AC–DC line converter. The alternating current excitation coils 105 and 106 with their respective terminals 107 and 108 are connected in parallel with the alternating current line 120. The direct current line 121 is connected to the terminals 115 of the armature winding. A control device 122 is connected to the connecting terminals 111 and 112 of the annular conductors in order to superimpose a constant field, the power of such constant field being adjustable through control device 122. To excite the annular conductors, control device 122 may be separately supplied or it may be supplied through conductor 124 by the direct current line. Supply through a conductor 123 or the conductor 124 may be selective.

The alternating current lines are to be connected to the connecting terminals 107 and 108 for the alternating current coils and the direct current cable is to be connected to the armature winding, i.e., terminals 115. The excitation coils 109 and 110 for superimposing the direct current magnetic field may be separately excited, or, in particular applications, may be controlled in dependence upon the current in the armature winding. It is to be understood that voltage converters or voltage limiters may also be inserted. It is to be noted that in DC to AC conversion, active power is supplied to the line through the AC coil and, at the same time, the AC coil absorbs idle power from the line to excite the rotating field. The machine then works as a type of asynchronous (induction) generator. The idle power may also be obtained from batteries of capacitors.

When used as a coupling device, the machine, according to the invention, provides the advantage in that a phase-coordination of the alternating current lines becomes superfluous. The machine may also be provided with reversing poles where axially outwardly extended armature windings are employed. Thereby, the switching paths are rendered current-free prior to their transition from the superconducting to the normally conducting state. Rotating commutating poles may be so disposed, coaxial with the armature winding, whereby they precede the rotating magnetic field at the extension of the armature winding.

For the purpose of coupling alternating current lines, two machines, according to the invention, may also be assembled into a unitary structure whereby a line coupling with an interpolated direct current circuit is obtained.

Figure 6:
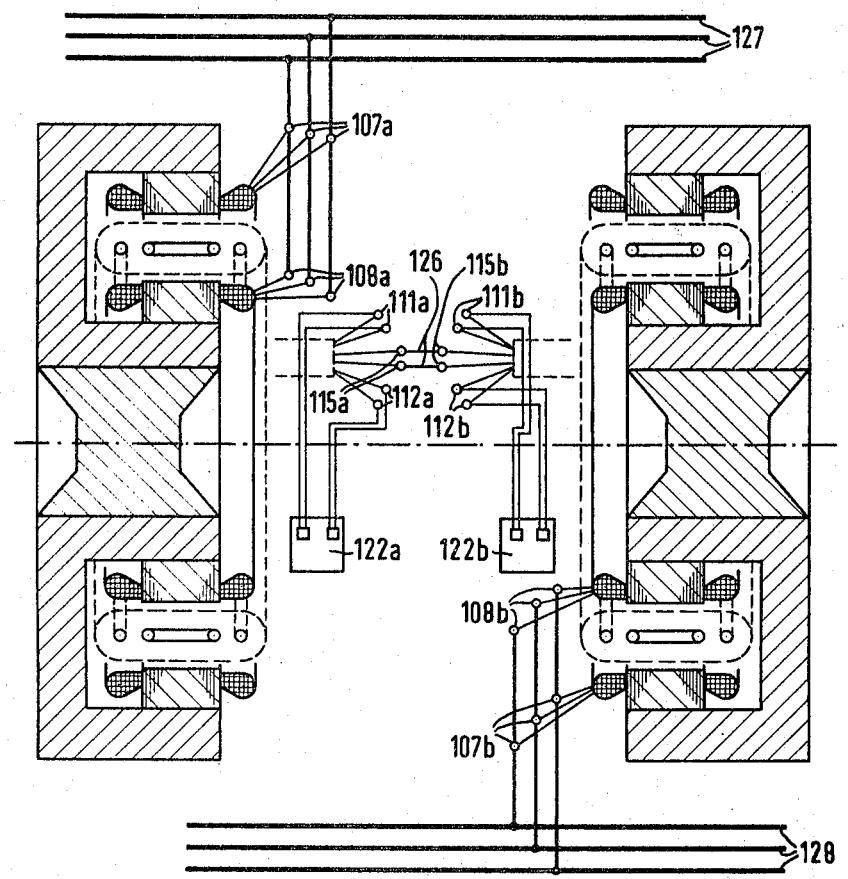
FIG. 6 is a depiction similar to that of FIGS. 2 and 5 of an embodiment according to the invention which may be employed as a coupling converter or transformer.

FIG. 6 shows two machines, as depicted in FIG. 2, which are electrically coupled between terminals 115a and 115b through a direct current connection. The designating numerals for the left machine in FIG. 6 contain the $a$ notation and the designating numerals for the right machine contain the $b$ notation. The direct current connection 126 may be designed to be a direct current cable between spaced machines or it may be a component of an internal direct current circuit in a coupling arrangement which is provided in the assembly of the two machines.

The illustrated coupling converters couple the alternating current line 127 with the alternating current line 128. The output from the armature windings which are coupled by connection 126 and the alternating current lines may be controlled by operating upon the direct current excitation of one or both machines. For this purpose, control devices 122a and 122b are provided.

It will be obvious to those skilled in the art upon studying this disclosure that commutating arrangements for electric machines having a superconducting armature winding according to my invention permit of a great variety of modifications and hence can be given embodiments other than those particularly illustrated herein without departing from the essential features of my invention and within the scope of the claims annexed hereto.

We claim:

1. Two electric machines coupled to each other by a direct current cable to provide a coupling converter for alternating current lines, each of said electric machines comprising a superconducting armature winding, said winding comprising a plurality of loops, each of said loops respectively including a portion which operates as a switching path and which is alternately switched between the normally conducting and superconducting states, field means for providing a multi-phase rotating magnetic field having a superimposed direct current field and which is movable relative to said switching paths for switching said paths between said states, said field means comprising annular sheet metal yokes connected to each other to form a cup-shaped magnet and annular excitation coils associated with said magnet.

2. In an electric machine as claimed in claim 1 further comprising a direct current circuit common to both of said machines.

3. Two electric machines coupled to each other by a direct current circuit common to both of said machines to provide a coupling converter unit for alternating current lines, each of said electric machines comprising a superconducting armature winding, said winding comprising a plurality of loops, each of said loops respectively including a portion which operates as a switching path which is alternately switched between the normally conducting and superconducting states, means for providing a multi-phase rotating magnetic field having a superimposed direct current field and which is movable relative to said switching paths for switching said paths between said states.

References Cited
UNITED STATES PATENTS 3,292,021  12/1966  Hoag _____ 310—40

OTHER REFERENCES

Electrical Review, Jan. 3, 1964, p. 22.

DAVID X. SLINEY, *Primary Examiner.*

U.S. Cl. X.R.

310—40, 52, 198